(12) United States Patent
Moon et al.

(10) Patent No.: US 7,305,706 B2
(45) Date of Patent: Dec. 4, 2007

(54) ESTABLISHING A VIRTUAL PRIVATE NETWORK FOR A ROAD WARRIOR

(75) Inventors: Bruce Moon, San Jose, CA (US); Mark Enright, Soquel, CA (US)

(73) Assignee: Cisco Technology, Inc., San Jose, CA (US)

( * ) Notice: Subject to any disclaimer, the term of this patent is extended or adjusted under 35 U.S.C. 154(b) by 551 days.

(21) Appl. No.: 10/758,757

(22) Filed: Jan. 15, 2004

(65) Prior Publication Data

US 2005/0160290 A1    Jul. 21, 2005

(51) Int. Cl.
*H04L 9/00* (2006.01)

(52) U.S. Cl. .......................................... 726/15; 380/247

(58) Field of Classification Search ................. 726/15, 726/2, 14; 380/247
See application file for complete search history.

(56) References Cited

U.S. PATENT DOCUMENTS

| | | | |
|---|---|---|---|
| 6,064,736 A | 5/2000 | Davis et al. | |
| 6,070,244 A | 5/2000 | Orchier et al. | |
| 6,128,298 A | 10/2000 | Wootton et al. | |
| 6,154,543 A | 11/2000 | Baltzley | |
| 6,202,156 B1 | 3/2001 | Kalajan | |
| 6,229,894 B1 | 5/2001 | Van Oorschot et al. | |
| 6,275,941 B1 | 8/2001 | Saito et al. | |
| 6,470,453 B1 | 10/2002 | Vilhuber | |
| 6,526,056 B1 | 2/2003 | Rekhter et al. | 370/392 |
| 6,606,708 B1 | 8/2003 | Devine et al. | |
| 6,640,302 B1 * | 10/2003 | Subramaniam et al. | 713/169 |
| 6,651,174 B1 | 11/2003 | Nagaoka et al. | |
| 6,678,283 B1 | 1/2004 | Teplitsky | |
| 6,678,827 B1 | 1/2004 | Rothermel et al. | |
| 6,907,532 B2 * | 6/2005 | Jari et al. | 726/15 |
| 6,976,177 B2 * | 12/2005 | Ahonen | 726/3 |
| 2001/0009025 A1 | 7/2001 | Ahonen | |
| 2001/0020275 A1 | 9/2001 | Jari et al. | |
| 2002/0042883 A1 | 4/2002 | Roux et al. | |
| 2002/0046349 A1 | 4/2002 | Saito | |
| 2002/0066029 A1 | 5/2002 | Yi | |
| 2002/0095507 A1 | 7/2002 | Jerdonek | |
| 2002/0129271 A1 | 9/2002 | Stanaway et al. | |
| 2003/0023879 A1 | 1/2003 | Wray | |
| 2003/0041268 A1 | 2/2003 | Hashimoto | |
| 2003/0056097 A1 | 3/2003 | Araki et al. | |
| 2003/0070095 A1 | 4/2003 | Okamoto et al. | |
| 2003/0126466 A1 | 7/2003 | Park et al. | |
| 2003/0196117 A1 | 10/2003 | Kenmochi et al. | |
| 2003/0204752 A1 | 10/2003 | Garrison | |
| 2003/0212907 A1 | 11/2003 | Genty et al. | |
| 2005/0044262 A1 | 2/2005 | Luo | 709/238 |

* cited by examiner

*Primary Examiner*—Gilberto Barron, Jr.
*Assistant Examiner*—Ellen Tran
(74) *Attorney, Agent, or Firm*—Beyer Weaver LLP

(57) ABSTRACT

Methods and devices are provided for establishing a VPN tunnel for a user whose IP address is not known in advance (a "road warrior"). The road warrior first initiates a secure authentication session with a security gateway. In some such implementations, the road warrior provides a username/password pair that the security gateway compares to a database of usernames that have been authorized to initiate a VPN tunnel. After authenticating the road warrior, the security gateway then determines the IP address of the road warrior, then makes a correlation between the IP address, user, and a shared secret allocated to the road warrior. If the road warrior uses the proper shared secret in connection with a request to establish a VPN tunnel, the security gateway will establish the VPN tunnel.

20 Claims, 6 Drawing Sheets

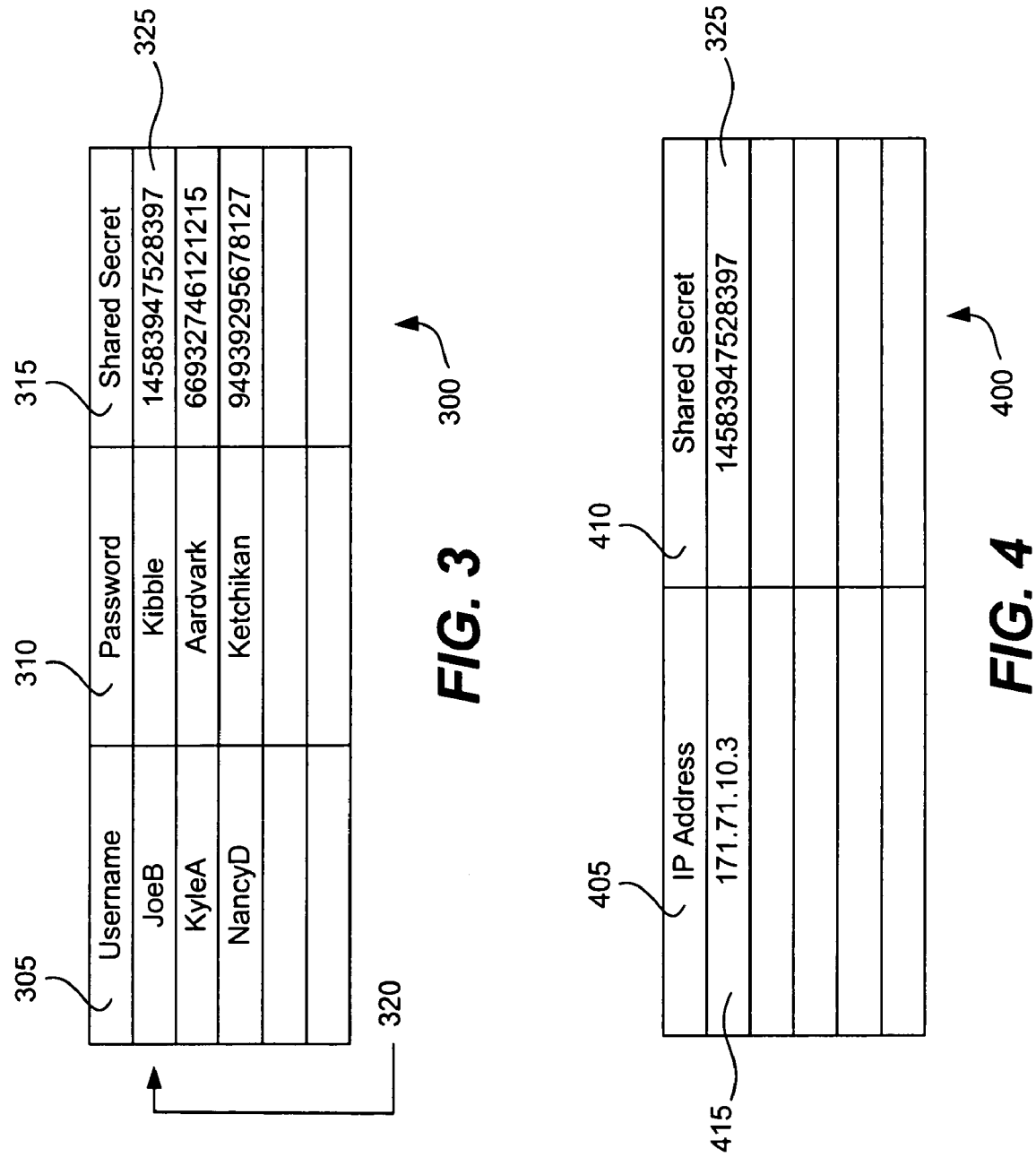

ESTABLISHING A VIRTUAL PRIVATE NETWORK FOR A ROAD WARRIOR

BACKGROUND OF THE INVENTION

1. Field of the Invention

The present invention relates to network technology. More particularly, the present invention relates to establishing virtual private network ("VPN") tunnels for a user whose IP address is not known in advance, known in the art and referred to herein as a "road warrior."

2. Description of the Related Art

Increasingly, users desire to access a private network securely via the Internet. The private network may be, for example, a home network, the private network of a business or other entity, etc. One commonly used method for accomplishing this goal is to establish a VPN tunnel, which to a user seems like a point-to-point connection between the user and the private network, but which does not allow an unauthorized third party to "snoop" the communications on the VPN tunnel. There are several methods and protocols known in the art for setting up VPN tunnels. One such well-known protocol is known as Internet Protocol Security ("IPSec").

An overview of one method for establishing a VPN tunnel between known IP addresses will now be described with reference to FIG. 1. Here, private network 101 includes user PC 105. In this example, the user wants to establish a VPN tunnel between PC 105 and server 125 in private network 121.

Security gateways 110 and 120 control communications between Internet 115 and private networks 101 and 121, respectively. Accordingly, security gateways 110 and 120 provide firewall and network address translation functions for private networks 101 and 121. Moreover, security gateways 110 and 120 will negotiate the parameters of a desired VPN tunnel, e.g., the types of authentication and encryption. Security gateway 110 will detect packets destined for a VPN tunnel (for example, because the destination is the address of server 125 within private network 121), encrypt the packets and encapsulate them with a header indicating security gateways 110 and 120 as the IP source and destination. Security gateway 120 receives the packet, strips off the encapsulation and decrypts the contents of packet. Then, security gateway 120 reads the destination address and forwards the packet to server 125.

Establishing a VPN tunnel between a private network and a road warrior is more problematic, primarily because the IP address of the road warrior is not known in advance. Some methods solve the problem by using digital certificates for authentication. A digital certificate is a one-way hash, which is a way of encoding information that only the road warrior's PC knows. The hash is then "signed" by a reputable certification authority, such as a third-party authentication server controlled by, for example, VeriSign™. On the other end, a public key of the certification authority is used to view the contents and determine whether the packet includes an authorized IP address.

Using digital certificates is an effective, but somewhat cumbersome, method of establishing a VPN tunnel between a private network and a road warrior. Digital certificates require a substantial amount of infrastructure, including the involvement of a third-party certification authority. The complexity and expense of this involvement make the use of digital certificates less than optimal for, e.g., forming a VPN tunnel to a home network.

Other methods enable any IP address to establish a VPN tunnel (for example, an IPSec tunnel) using a particular widely shared secret. However, it is well known that such widely shared secrets can easily be discovered and used by unauthorized persons. These "shared secrets" are shared by everyone involved and are not separate secrets for each client.

It would be desirable to implement improved methods for forming a VPN tunnel between a road warrior and a private network, particularly when the private network is a home network.

SUMMARY OF THE INVENTION

Methods and devices are provided for establishing a VPN tunnel for a road warrior. The road warrior first initiates a secure authentication session with a security gateway. In some such implementations, the road warrior provides a username/password pair that the security gateway compares to a database of usernames that have been authorized to initiate a VPN tunnel. After authenticating the road warrior, the security gateway then determines the IP address of the road warrior, then makes a correlation between the authenticated user and a shared secret allocated to the road warrior. If the road warrior uses the proper shared secret in connection with a request to establish a VPN tunnel, the security gateway will establish the VPN tunnel.

Some implementations of the invention provide a method of establishing a virtual private network tunnel. The method includes the following steps: receiving, from a user whose IP address is not known in advance, a first request to form an encrypted tunnel with a security gateway; forming the encrypted tunnel; authenticating the user; determining an IP address of the user; establishing a correspondence between the IP address and a first shared secret authorized for the user; receiving a second request from the user to form a virtual private network tunnel, the request incorporating a second shared secret; determining whether the first shared secret matches the second shared secret; and forming the virtual private network tunnel when the first shared secret matches the second shared secret.

The first request may be a request to form a Hypertext Transfer Protocol over Secure Socket Layer session. The authenticating step may involve receiving and verifying a username/password pair from the user. The second request may be a request to form an IPSec tunnel. The establishing step may involve comparing a username and password provided by the user with a database of usernames, passwords and shared secrets.

The second request may incorporate a hashing function based on the second shared secret. The step of determining whether the first shared secret matches the second shared secret may involve attempting to decrypt at least a portion of the second request. The establishing step may involve entering the IP address and the first shared secret in an IPSec table. The entry may be a temporary entry that is deleted after the occurrence of a predetermined event, such as a passage of a predetermined time. The virtual private network tunnel is preferably torn down when the temporary entry is deleted.

Some embodiments of the invention provide a computer program embodied in a machine-readable medium. The computer program includes instructions for controlling a security gateway to perform the following steps: receiving, from a user whose IP address is not known in advance, a first request to form an encrypted tunnel with a security gateway; forming the encrypted tunnel; authenticating the user; determining an IP address of the user; establishing a correspondence between the IP address and a first shared secret authorized for the user; receiving a second request from the user to form a virtual private network tunnel, the request incorporating a second shared secret; determining whether the first shared secret matches the second shared secret; and forming the virtual private network tunnel when the first shared secret matches the second shared secret.

The first request may be a request to form a Hypertext Transfer Protocol over Secure Socket Layer session. The authenticating step may involve receiving and verifying a username/password pair from the user. The second request may be a request to form an IPSec tunnel. The establishing step may involve comparing a username and password provided by the user with a database of usernames, passwords and shared secrets. The second request may incorporate a hashing function based on the second shared secret. The step of determining whether the first shared secret matches the second shared secret may involve attempting to decrypt at least a portion of the second request.

Alternative embodiments of the invention provide a security gateway. The securing gateway includes the following: a first port configured for communication with the Internet; a second port configured for communication with a private network; and one or more processors. The processor or processors are configured to do the following: receive, via the first port, a first request to form an encrypted tunnel with a security gateway from a user whose IP address is not known in advance; form the encrypted tunnel; authenticate the user; determine an IP address of the user; establish a correspondence between the IP address and a first shared secret authorized for the user; receive a second request from the user to form a virtual private network tunnel, the request incorporating a second shared secret; determine whether the first shared secret matches the second shared secret; and form the virtual private network tunnel when the first shared secret matches the second shared secret.

Other implementations of the invention provide a method of establishing a virtual private network tunnel. The method includes the following steps: receiving, from a user whose IP address is not known in advance, a first request to form an encrypted tunnel with a security gateway; forming the encrypted tunnel; authenticating the user; determining an IP address of the user; establishing a correspondence between the IP address and a subject of a digital certificate; receiving a second request from the user to form a virtual private network tunnel, the request incorporating the digital certificate; determining that the subject of the digital certificate is an expected subject; and forming the virtual private network tunnel when the subject of the digital certificate is the expected subject.

BRIEF DESCRIPTION OF THE DRAWINGS

FIG. 3 is a table that illustrates contents of a database used by some aspects of the invention.

FIG. 4 is a table that illustrates contents of a database used by some aspects of the invention.

DETAILED DESCRIPTION OF THE INVENTION

In the following description, numerous specific details are set forth in order to provide a thorough understanding of the present invention. It will be obvious, however, to one skilled in the art, that the present invention may be practiced without some or all of these specific details. In other instances, well known process steps have not been described in detail in order not to obscure the present invention.

Figure 1:
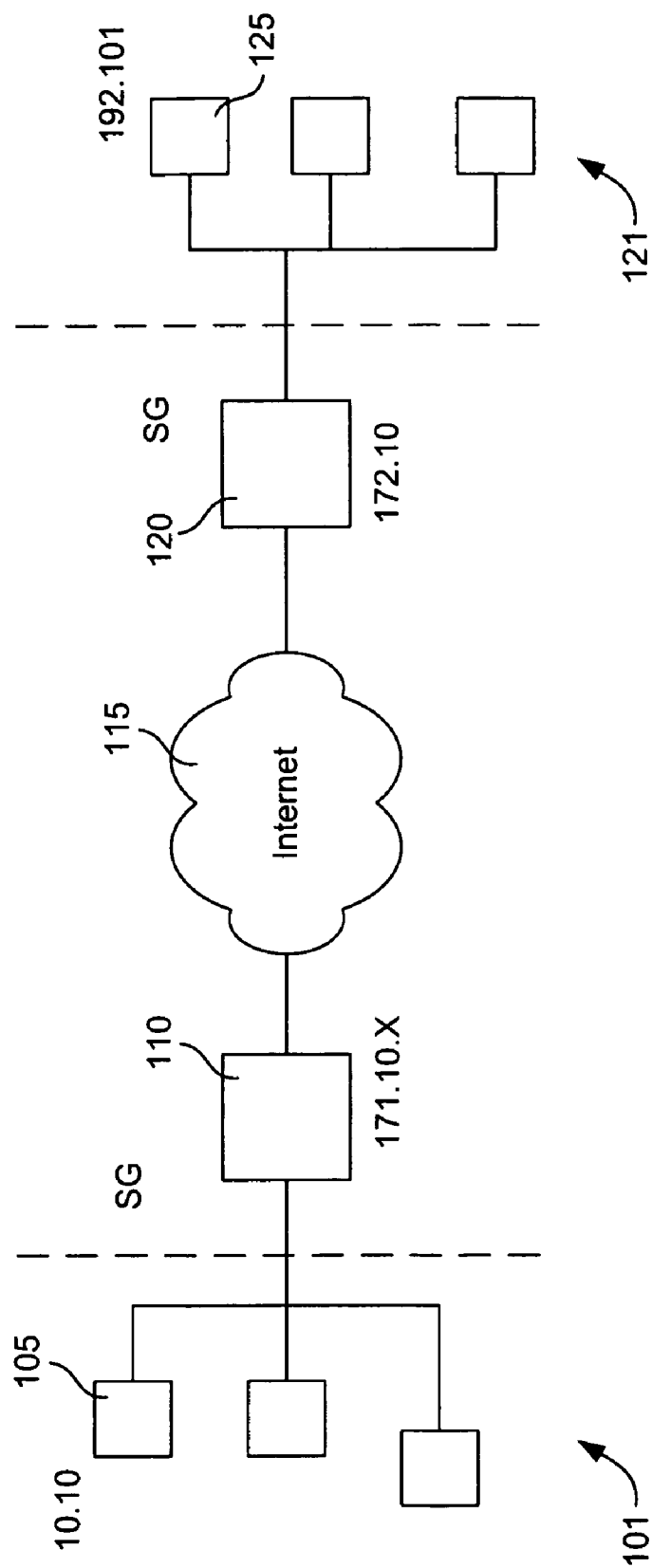
FIG. 1 is a network diagram illustrating two private networks connected by the Internet.
Figure 2A:
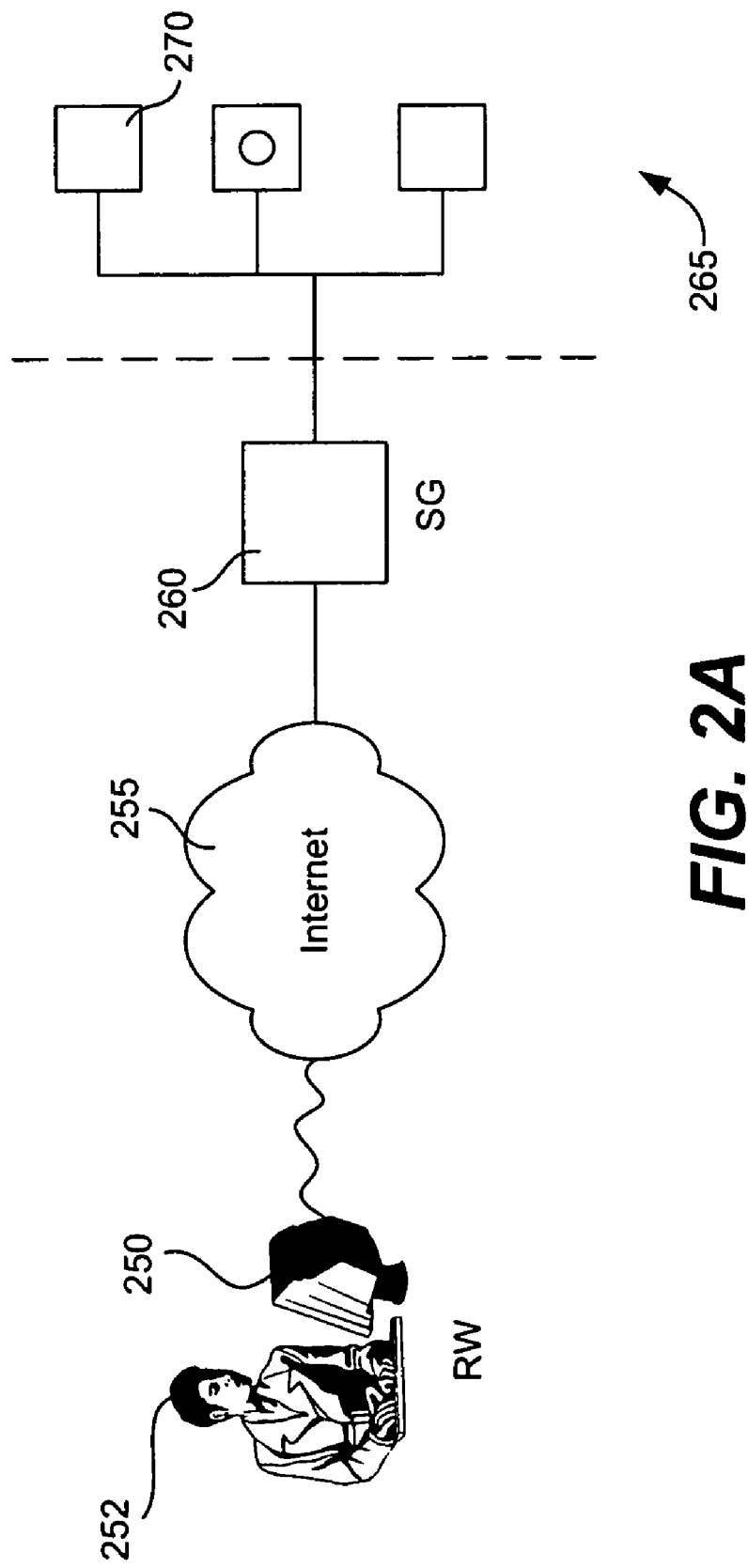
FIG. 2A is a network diagram that indicates one context for implementing the present invention.

FIG. 2A is a network diagram that indicates one context for implementing the present invention. Here, road warrior 252 is operating device 250, which is a notebook computer in this example. Device 250 is communicating with security gateway 260 via Internet 255. Road warrior 252 wants to establish a VPN tunnel between device 250 and server 270 of private network 265.

Figure 2B:
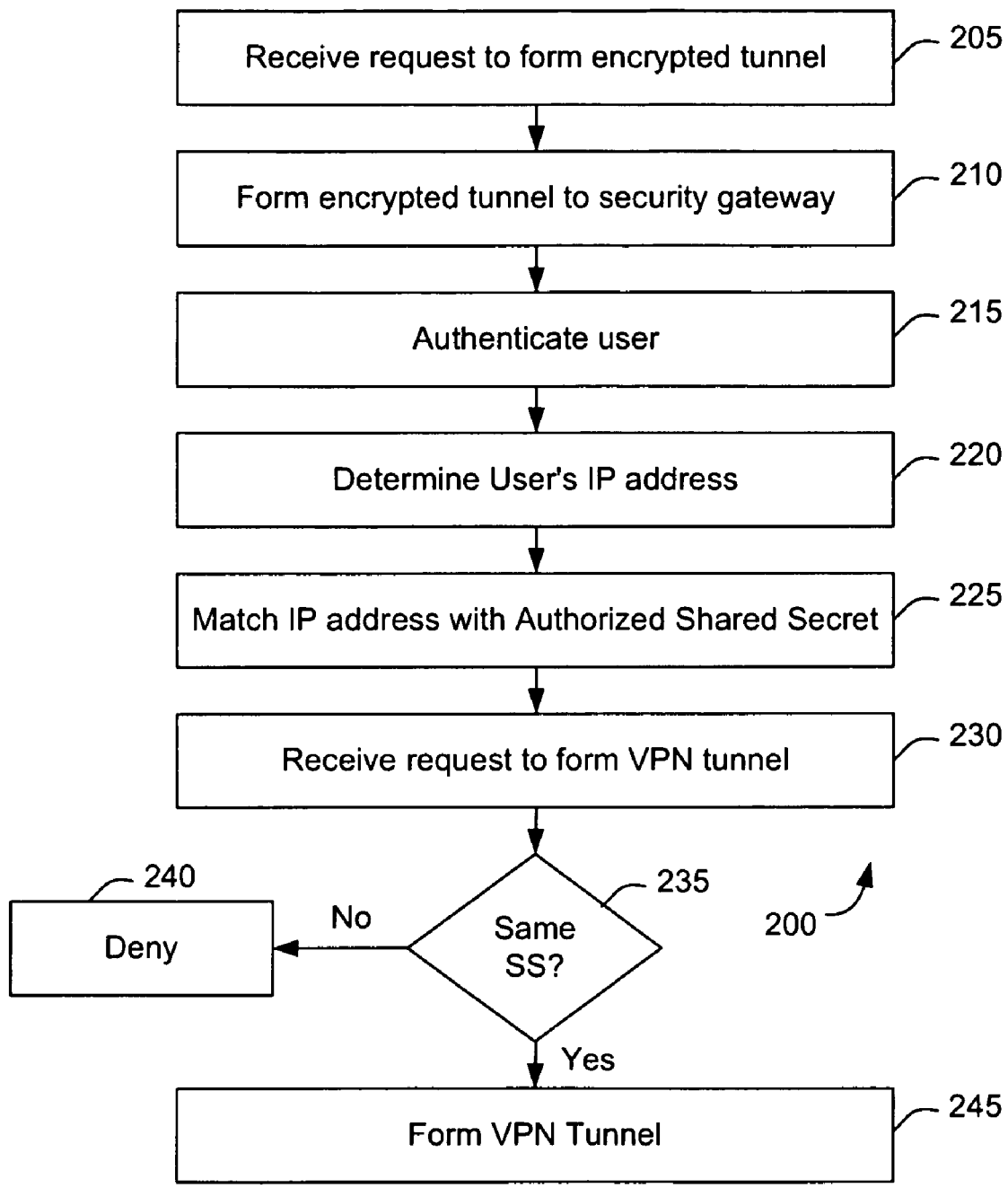
FIG. 2B is a flow chart that outlines a method according to some aspects of the invention.

FIG. 2B is a flow chart that provides a high-level description of some implementations of the invention. The steps of method 200 are described from the perspective of a security gateway. In step 205, a security gateway receives a request via the Internet from a road warrior (e.g., from device 250 operated by road warrior 252 of FIG. 2A) to be authenticated in order to form an encrypted tunnel between the road warrior and the security gateway (e.g., security gateway 260 of FIG. 2).

In this example, the security gateway receives a request to initiate an HTTPS (Hypertext Transfer Protocol over Secure Socket Layer, or HTTP over SSL) session in step 205 and forms an encrypted tunnel according to the https protocol in step 210. As known by those of skill in the art, HTTPS is a protocol developed by Netscape™ and built into Netscape's browser. HTTPS is also built into virtually every modern browser and is the basis for all secure monetary transactions over the Internet.

HTTPS encrypts and decrypts user page requests and the pages that are returned to the user. HTTPS uses Netscape's Secure Socket Layer (SSL) as a sublayer under its HTTP application layering. The request is processed by a daemon responsible for processing https requests, which may be, e.g., an HTTP daemon, an HTTPS daemon, or a combination of the two. Those of skill in the art will appreciate that there are various other authentication methods, such as those provided by Radius®, CRYPTOCard™, RSA's™ SecurID® and Secure Computing™'s SafeWord®. These methods typically require additional hardware and proprietary software to be installed and maintained.

In step 215, the road warrior is authenticated. The encrypted tunnel is used to transmit authentication information from the road warrior, e.g., a username/password pair, according to methods known by those of skill in the art. Although FIG. 2B implies that the road warrior would always be successfully authenticated, it should be understood that this would not be the case if the road warrior did not provide the proper authentication information to the security gateway. For example, the road warrior might be given a predetermined number of attempts to provide this information before the security gateway refuses the request.

In step 220, the security gateway determines the road warrior's IP address. In some implementations, the security gateway performs step 220 by running a Java™ applet. However, other browser scripting methods, such as ActiveX or C# from Microsoft, could be also be used. This could also be accomplished in implementations that do not allow for NAT addressing by simple inspection of the source address of the HTTPS request packets. A user activated program on device 250 could query its own IP address and send this information in an encrypted or unencrypted format to security gateway 260.

The security gateway then establishes a correspondence between the IP address determined in step 220 and a shared secret associated with the road warrior. An example of this process will now be described with reference to FIGS. 3 and 4. FIG. 3 is a table that illustrates how authentication information may be associated with shared secrets in a database accessible by a security gateway. The information in the database is provisioned ahead of time, i.e., before the time that a road warrior initiates the process illustrated in FIG. 2. In this example, table 300 includes username field 305, password field 310 and shared secret field 315. Referring to row320, road warrior JoeB has a password "Kibble" and an associated shared secret 325. Those of skill in the art will realize that shared secret 325 could be any string of numbers, letters, etc.

By reference to the database depicted in FIG. 3, the security gateway can establish a correspondence between the user name determined in 215, and the appropriate shared secret 325, which is the authorized shared secret for JoeB in this example. Further, the security gateway can establish a correspondence between the user name determined in 215, and the ip address established in 220. Using the above two correspondences, the security gateway can transitively establish a correspondence between the shared secret 325, and the IP address 220. This correspondence is illustrated by the table shown in FIG. 4, which includes IP address field 405 and shared secret field 410. JoeB's IP address 415 is associated with the shared secret 325 authorized for his use. As will be appreciated by those of skill in the art, FIGS. 3 and 4 may be part of the same data structure. The database that is schematically depicted in FIG. 4 does not need to exist except ephemerally until VPN provisioning. In one implementation, the database that conceptually links a specific IP address to a specific shared secret is the configuration file of the IPSec software. This implementation must have a distinct database for IPSec software and another database for the "glue" software.

Referring again to FIG. 2B, the next step (230) of method 200 (from the vantage point of the security gateway) is the receipt of a request to form a VPN tunnel between the road warrior and a device within the private network controlled by the security gateway (e.g., private network 265, shown in FIG. 2A). The request incorporates a shared secret known by the road warrior (or at least by device 250), but the shared secret need not be sent in the form of a password. As will be appreciated by those of skill in the art, the shared secret may be incorporated in various ways. In preferred embodiments, the shared secret is used as an input in forming at least a portion of the request, e.g., as a product of a hashing operation. However, for implementations based upon IPSec, the shared secret must be transmitted/interpreted in a standard way.

In step 235, the security gateway determines whether the shared secret incorporated in the request is the same shared secret authorized for use by the road warrior. For example, the security gateway may accept or deny a request from JoeB based on whether the security gateway can successfully decrypt his request (or a portion thereof). In this example, the decryption is based on shared secret 325 authorized for JoeB and corresponding to his current IP address (see FIG. 4). However, any convenient method of validating the shared secret proffered by the road warrior may be used in step 235.

If the request has embodied the correct shared secret, the security gateway forms the requested VPN tunnel (step 245). If not, the request is denied (step 240). Some embodiments may permit the road warrior to make multiple requests before the tunnel formed in step 210 is torn down, but others will tear down the tunnel even if only a single request is denied.

According to preferred implementations of the invention, the security gateway only temporarily associates the IP address of a road warrior with an authorized shared secret. For example, when a VPN tunnel is formed based upon a request from road warrior JoeB, IP Address 415 and its corresponding shared secret as per FIG. 4 is preferably stored by the gateway only during the time that the VPN tunnel exists.

Figure 5:
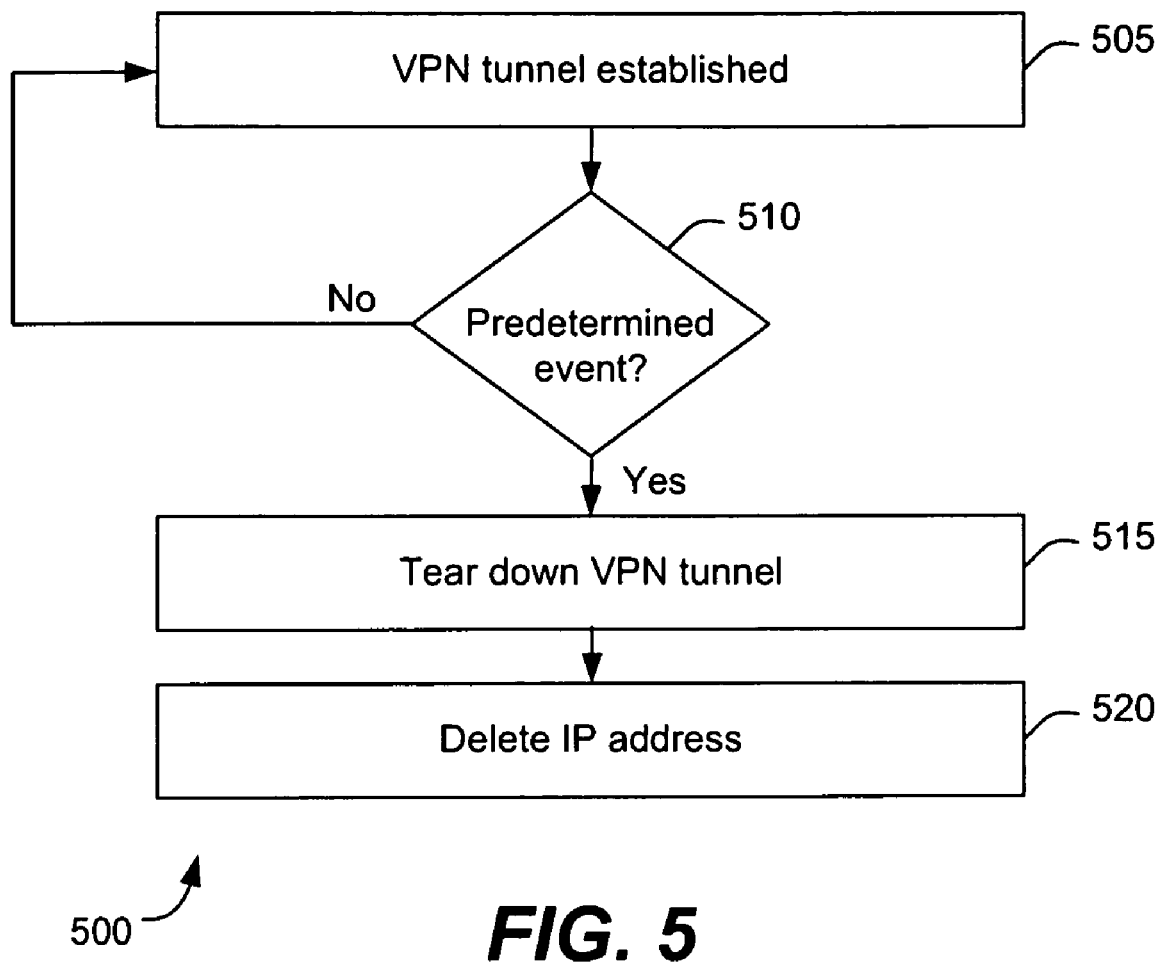
FIG. 5 is a flow chart that outlines a method according to some aspects of the invention.

FIG. 5 is a flow chart that illustrates a process of tearing down a VPN tunnel according to some implementations of the invention. In step 505, a VPN tunnel has already been established. In step 510, the security gateway determines whether a predetermined event has transpired. The event may be, for example, a predetermined period of time that the VPN tunnel has been formed, a predetermined period of time that there has been no traffic on the VPN tunnel, a request from a user, etc. If so, the VPN tunnel is torn down (step 515) and the road warrior's IP address/shared secret is deleted from the FIG. 4 data base (step 520). It will be appreciated by those of skill in the art that step 520 may take place prior to step 515.

Figure 6:
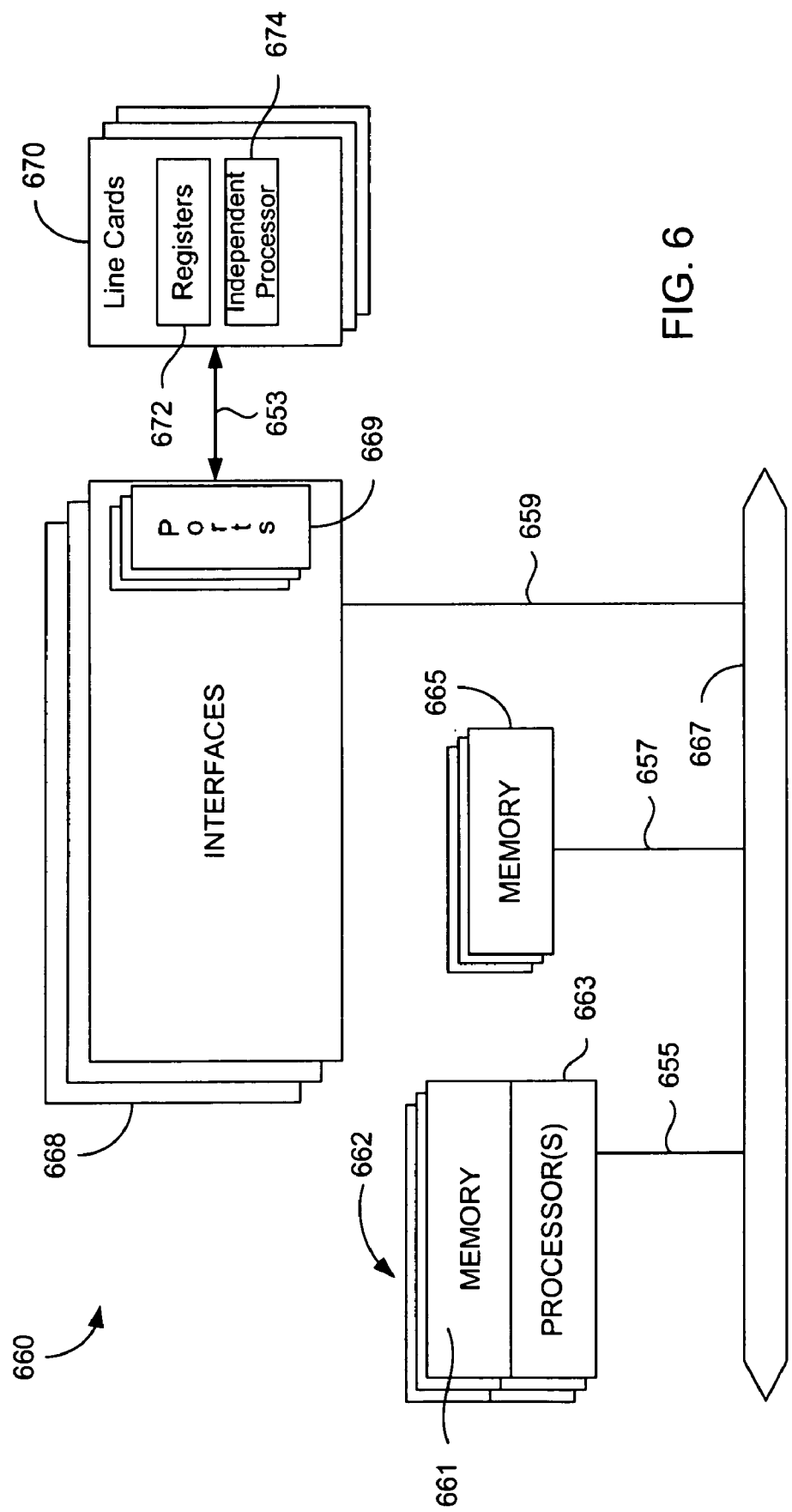
FIG. 6 illustrates a simplified version of a network device that may be configured to implement some aspects of the present invention.

FIG. 6 illustrates an example of a network device that may be configured to implement some methods of the present invention. Network device 660 includes a master central processing unit (CPU) 662, interfaces 668, and a bus 667 (e.g., a PCI bus). Generally, interfaces 668 include ports 669 appropriate for communication with the appropriate media. In some embodiments, one or more of interfaces 668 includes at least one independent processor 674 and, in some instances, volatile RAM. Independent processors 674 may be, for example ASICs or any other appropriate processors. According to some such embodiments, these independent processors 674 perform at least some of the functions of the logic described herein. In some embodiments, one or more of interfaces 668 control such communications-intensive tasks as media control and management. By providing separate processors for the communications-intensive tasks, interfaces 668 allow the master microprocessor 662 efficiently to perform other functions such as routing computations, network diagnostics, security functions, etc.

The interfaces 668 are typically provided as interface cards (sometimes referred to as "linecards"). Generally, interfaces 668 control the sending and receiving of data packets over the network and sometimes support other peripherals used with the network device 660. Among the interfaces that may be provided are FC interfaces, Ethernet interfaces, frame relay interfaces, cable interfaces, DSL interfaces, token ring interfaces, and the like. In addition, various very high-speed interfaces may be provided, such as fast Ethernet interfaces, Gigabit Ethernet interfaces, ATM interfaces, HSSI interfaces, POS interfaces, FDDI interfaces, ASI interfaces, DHEI interfaces and the like.

When acting under the control of appropriate software or firmware, in some implementations of the invention CPU 662 may be responsible for implementing specific functions associated with the functions of a desired network device. According to some embodiments, CPU 662 accomplishes all these functions under the control of software including an operating system (e.g., Cisco IOS, a proprietary operating system developed by Cisco Systems, Inc., etc.) and any appropriate applications software.

CPU 662 may include one or more processors 663 such as a processor from the Motorola family of microprocessors or the MIPS family of microprocessors. In an alternative embodiment, processor 663 is specially designed hardware for controlling the operations of network device 660. In a specific embodiment, a memory 661 (such as non-volatile RAM and/or ROM) also forms part of CPU 662. However, there are many different ways in which memory could be coupled to the system. Memory block 661 may be used for a variety of purposes such as, for example, caching and/or storing data, programming instructions, etc.

Regardless of network device's configuration, it may employ one or more memories or memory modules (such as, for example, memory block 665) configured to store data, program instructions for the general-purpose network operations and/or other information relating to the functionality of the techniques described herein. The program instructions may control the operation of an operating system and/or one or more applications, for example.

Because such information and program instructions may be employed to implement the systems/methods described herein, the present invention relates to machine-readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although the system shown in FIG. 6 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device. The communication path between interfaces/linecards may be bus based (as shown in FIG. 6) or switch fabric based (such as a cross-bar).

Other Embodiments

Generally, the techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the techniques of this invention may be implemented on a general-purpose programmable machine selectively activated or reconfigured by a computer program stored in memory. Such a programmable machine may be a network device designed to handle network traffic, such as, for example, the network device described above with reference to FIG. 6. In an alternative embodiment, the techniques of this invention may be implemented on a general-purpose network host machine such as a personal computer or workstation. Further, the invention may be at least partially implemented on a card (e.g., an interface card) for a network device or a general-purpose computing device.

Although illustrative embodiments and applications of this invention are shown and described herein, many variations and modifications are possible which remain within the concept, scope, and spirit of the invention, and these variations would become clear to those of ordinary skill in the art after perusal of this application.

For example, although the invention has been described herein using shared secrets as an authentication method, the invention is not so limited. Alternative implementations of the invention use, e.g. digital certificates for authentication purposes. According to some such implemenations, a correspondence is established between a user whose IP address is not known in advance and a subject of a digital certificate. A VPN tunnel will be established if the subject of the digital certificate is an expected subject.

Accordingly, the present embodiments are to be considered as illustrative and not restrictive, and the invention is not to be limited to the details given herein, but may be modified within the scope and equivalents of the appended claims.

We claim:

1. A method of establishing a virtual private network tunnel, the method comprising:
    receiving, from a user whose IP address is not known in advance, a first request to form an encrypted tunnel with a security gateway;
    forming the encrypted tunnel;
    authenticating the user;
    determining an IP address of the user;
    establishing a correspondence between the IP address and a first shared secret authorized for the user;
    receiving a second request from the user to form a virtual private network tunnel, the request incorporating a second shared secret;
    determining whether the first shared secret matches the second shared secret; and
    forming the virtual private network tunnel when the first shared secret matches the second shared secret.

2. The method of claim 1, wherein the first request comprises a request to form a Hypertext Transfer Protocol over Secure Socket Layer session.

3. The method of claim 1, wherein the authenticating step comprises receiving and verifying a username/password pair from the user.

4. The method of claim 1, wherein the second request comprises a request to form an IPSec tunnel.

5. The method of claim 1, wherein the establishing step comprises comparing a username and password provided by the user with a database of usernames, passwords and shared secrets.

6. The method of claim 1, wherein the second request incorporates a hashing function based on the second shared secret.

7. The method of claim 1, wherein the step of determining whether the first shared secret matches the second shared secret comprises attempting to decrypt at least a portion of the second request.

8. The method of claim 1, wherein the establishing step comprises making an entry in an IPSec table, the entry comprising the IP address and the first shared secret.

9. The method of claim 8, wherein the entry is a temporary entry that is deleted after the occurrence of a predetermined event.

10. The method of claim 9, wherein the predetermined event comprises a passage of a predetermined time.

11. The method of claim 9, further comprising the step of tearing down the virtual private network tunnel when the temporary entry is deleted.

12. A computer program embodied in a machine-readable medium, the computer program comprising instructions for controlling a security gateway to perform the following steps:
receiving, from a user whose IP address is not known in advance, a first request to form an encrypted tunnel with a security gateway;
forming the encrypted tunnel;
authenticating the user;
determining an IP address of the user;
establishing a correspondence between the IP address and a first shared secret authorized for the user;
receiving a second request from the user to form a virtual private network tunnel, the request incorporating a second shared secret;
determining whether the first shared secret matches the second shared secret; and
forming the virtual private network tunnel when the first shared secret matches the second shared secret.

13. The computer program of claim 12, wherein the first request comprises a request to form a Hypertext Transfer Protocol over Secure Socket Layer session.

14. The computer program of claim 12, wherein the authenticating step comprises receiving and verifying a username/password pair from the user.

15. The computer program of claim 12, wherein the second request comprises a request to form an IPSec tunnel.

16. The computer program of claim 12, wherein the establishing step comprises comparing a username and password provided by the user with a database of usernames, passwords and shared secrets.

17. The computer program of claim 12, wherein the second request incorporates a hashing function based on the second shared secret.

18. The computer program of claim 12, wherein the step of determining whether the first shared secret matches the second shared secret comprises attempting to decrypt at least a portion of the second request.

19. A security gateway, comprising:
means for receiving, from a user whose IP address is not known in advance, a first request to form an encrypted tunnel with a security gateway;
means for forming the encrypted tunnel;
means for authenticating the user;
means for determining an IP address of the user;
means for establishing a correspondence between the IP address and a first shared secret authorized for the user;
means for receiving a second request from the user to form a virtual private network tunnel, the request incorporating a second shared secret;
means for determining whether the first shared secret matches the second shared secret; and
means for forming the virtual private network tunnel when the first shared secret matches the second shared secret.

20. A security gateway, comprising:
a first port configured for communication with the Internet;
a second port configured for communication with a private network; and
at least one processor configured to:
receive, via the first port, a first request to form an encrypted tunnel with a security gateway from a user whose IP address is not known in advance;
form the encrypted tunnel;
authenticate the user;
determine an IP address of the user;
establish a conespondence between the IP address and a first shared secret authorized for the user;
receive a second request from the user to form a virtual private network tunnel, the request incorporating a second shared secret;
determine whether the first shared secret matches the second shared secret; and
form the virtual private network tunnel when the first shared secret matches the second shared secret.

* * * * *